(12) United States Patent
Corattiyil et al.

(10) Patent No.: US 7,993,425 B2
(45) Date of Patent: Aug. 9, 2011

(54) FREE VORTEX AIR-OIL SEPARATOR

(75) Inventors: Bala Corattiyil, Cincinnati, OH (US);
Duane Howard Anstead, Fairfield, OH (US); Mark Eden Zentgraf, Cincinnati, OH (US); Stephen Anthony Wilton, West Chester, OH (US); Ramon Themudo, Cincinnati, OH (US); Gary Paul Moscarino, Cincinnati, OH (US); Kenneth Lee Fisher, Blue Ash, OH (US)

(73) Assignee: General Electric Company, Schenectady, NY (US)

( * ) Notice: Subject to any disclaimer, the term of this patent is extended or adjusted under 35 U.S.C. 154(b) by 823 days.

(21) Appl. No.: 11/946,128

(22) Filed: Nov. 28, 2007

(65) Prior Publication Data

US 2009/0133961 A1    May 28, 2009

(51) Int. Cl.
*B01D 46/18* (2006.01)
(52) U.S. Cl. .............. 55/406; 55/407; 55/408; 55/400; 55/409; 95/241; 95/261; 95/266; 95/270; 96/155; 96/187; 96/193; 96/194; 96/214; 96/206; 96/208; 138/89; 184/6.26; 184/11.2; 184/6.21; 184/6.23; 184/6.24; 60/39.08; 415/169.1
(58) Field of Classification Search ............... 55/406, 55/407, 408, 400, 409; 95/241, 261, 266, 95/270; 96/155, 187, 193, 194, 206, 208, 96/214; 184/6.26, 11.2, 6.21, 6.23, 6.24; 138/89; 60/39.08; 415/169.1
See application file for complete search history.

(56) References Cited

U.S. PATENT DOCUMENTS

| | | | | |
|---|---|---|---|---|
| 5,051,072 A * | 9/1991 | Yano et al. | | 417/435 |
| 5,193,645 A * | 3/1993 | Francois | | 184/6.12 |
| 5,201,845 A | 4/1993 | Allmon et al. | | |
| 5,776,229 A * | 7/1998 | Blanes et al. | | 96/188 |
| 6,033,450 A | 3/2000 | Krul et al. | | |
| 6,705,349 B2 | 3/2004 | Themudo et al. | | |
| 6,858,056 B2 * | 2/2005 | Kwan | | 55/400 |
| 6,996,968 B2 | 2/2006 | Peters et al. | | |
| 7,063,734 B2 * | 6/2006 | Latulipe et al. | | 96/189 |
| 7,124,857 B2 | 10/2006 | Gekht et al. | | |
| 7,566,356 B2 * | 7/2009 | Latulipe et al. | | 55/400 |
| 2004/0031391 A1 * | 2/2004 | Grimm et al. | | 96/209 |

* cited by examiner

*Primary Examiner* — Jason M Greene
*Assistant Examiner* — Dung Bui
(74) *Attorney, Agent, or Firm* — General Electric Company; William Scott Andes; Marcella R. Louke

(57) ABSTRACT

The present invention provides a free vortex air-oil separator that may be used in systems for separating oil from air oil mixtures. The free vortex air-oil separator comprises a free vortex chamber having a first chamber wall, a second chamber wall located axially aft from the first chamber wall and a rim located in a radially outer region from an axis of rotation, a plurality of vent holes in the rim and a cavity formed by the first and second chamber walls, and the rim, wherein a free vortex is created when there is a flow into the cavity through the plurality of vent holes.

18 Claims, 3 Drawing Sheets

FREE VORTEX AIR-OIL SEPARATOR

CROSS REFERENCE TO RELATED APPLICATIONS

This specification is related to and incorporates herein by reference U.S. application Ser. No. 11/946,103, entitled "AIR-OIL SEPARATOR" and U.S. application Ser. No. 11/946,111, entitled "VORTEX AIR-OIL SEPARATOR SYSTEM" which were filed concurrently with this application.

BACKGROUND OF THE INVENTION

This invention relates generally to gas turbine engines and more particularly to a free vortex air oil separator for recovering oil used to lubricate and cool bearings used in gearboxes and other components of a gas turbine engine.

Gas turbine engines typically include a core having a compressor for compressing air entering the core, a combustor where fuel is mixed with the compressed air and then burned to create a high energy gas stream, and a high pressure turbine which extracts energy from the gas stream to drive the compressor. In aircraft turbofan engines, a low pressure turbine located downstream from the core extracts more energy from the gas stream for driving a fan. The fan usually provides the main propulsive thrust generated by the engine.

Bearings are used in the engine to accurately locate and rotatably mount rotors with respect to stators in the compressor and high and low pressure turbines of the engine. The bearings are enclosed in oil-wetted portions of the engine called sumps.

In order to prevent overheating of the bearings, lubricating oil and seals must be provided to prevent the hot air in the engine flowpath from reaching the bearing sumps, and lubricating oil flows must be sufficient to carry away heat generated internally by the bearings because of their high relative speed of rotation and heat load from environment.

Oil consumption arises from the method used to seal the bearing sumps. The sealing method makes it necessary for an air flow circuit to exist that flows into and out of the sumps. This flow ultimately contains oil that is unrecoverable unless adequately separated and delivered back to the sumps. In one particular configuration the forward engine sump is vented through the forward fan shaft and out of the engine through a center vent tube. Once the air/oil mixture exits the sump, it swirls, depositing oil on the inside of the fan shaft. Oil that is contained in the air/oil mixture is lost when it is unable to centrifuge back into the sump through the vent hole due to rapidly escaping vent air.

Some conventional designs allow for oil recovery by using weep holes, which are passages whose function is to provide a dedicated path for oil to re-enter the sump, integrated into the forward fan shaft design. In other conventional designs, the fan shaft has no dedicated weep holes, only vent holes. Some conventional designs use a weep plug in a rotating shaft that injects the air-oil mixture radially into a chamber for separating the oil and air, and routes the separated oil through a passage in the weep plug. The weep plug allows the air-oil mixture to radially enter a separator cavity through a central passage in the weep plug. As the air-oil mixture swirls down to a lower radius centrifugal forces drive the more massive oil particles back to the inside diameter of the shaft, while the air escapes through the vent exit. Other conventional designs use holes in the engine high pressure turbine (HPT) or low pressure turbine (LPT) shafts or gearbox shafts for oil separation. In some conventional designs, these holes in the shaft may be filled with honeycomb or sponge-like substances to enhance the oil separation. Conventional air-oil separators commonly used in gearboxes and gas turbine engines are either the forced-vortex static type or rotating mechanical type. The forced-vortex static separators are typically part of the overboard vent circuit or oil reservoir assembly mounted in a static structure and these systems centrifuge out the oil from air-oil mixture in the forced vortex. Conventional rotating mechanical separators typically use the main engine or gearbox shaft holes for mechanical separation. The gearbox separators are either mounted externally on a pad of the gearbox or use the internal gear shaft holes to mechanically separate air and oil. In some cases these holes are filled with honeycomb or an open cell porous substance to enhance this mechanical separation. These devices are typically limited in their separation strength and thus efficiency. Air-oil separation is particularly poor in these conventional designs in cases where the axial distances are short in the sump region. It has been found that without adequate dwell time for vortex motion, oil separation from the air-oil mixture will be poor. The bearings normally operate at high loads and speeds and, as a result, usually run at high temperatures. The lubrication oil that is supplied provides cooling to the bearings. However the air-oil mixture that is formed in the sump acquires a high temperature. It is more difficult to separate the oil from the air-oil mixture at higher temperatures.

It is desirable to have an air-oil separator that is effective in removing oil in engine systems and gearboxes which have sumps that are axially short. It is desirable to have a free vortex air-oil separator system with increased dwell time at larger radii for the vortex motion and higher vortex rotational speed for the air-oil mixture. It is desirable to have a free vortex air-oil separator that can cool the air-oil mixture prior to separating the oil from the air-oil mixture.

BRIEF DESCRIPTION OF THE INVENTION

The present invention provides a free vortex air-oil separator that may be used in systems for separating oil from air oil mixtures. The free vortex air-oil separator comprises a free vortex chamber having a first chamber wall, a second chamber wall located axially aft from the first chamber wall and a rim located in a radially outer region from an axis of rotation, a plurality of vent holes in the rim and a cavity formed by the first and second chamber walls, and the rim, wherein a free vortex is created when there is a flow into the cavity through the plurality of vent holes. In one aspect of the invention, the air-oil mixture is cooled prior to its entry into the free vortex air-oil separator.

BRIEF DESCRIPTION OF THE DRAWINGS

The subject matter which is regarded as the invention is particularly pointed out and distinctly claimed in the concluding part of the specification. The invention, in accordance with preferred and exemplary embodiments, together with further objects and advantages thereof, is described in the following detailed description taken in conjunction with the accompanying drawings in which:

DETAILED DESCRIPTION OF THE INVENTION

Figure 1:
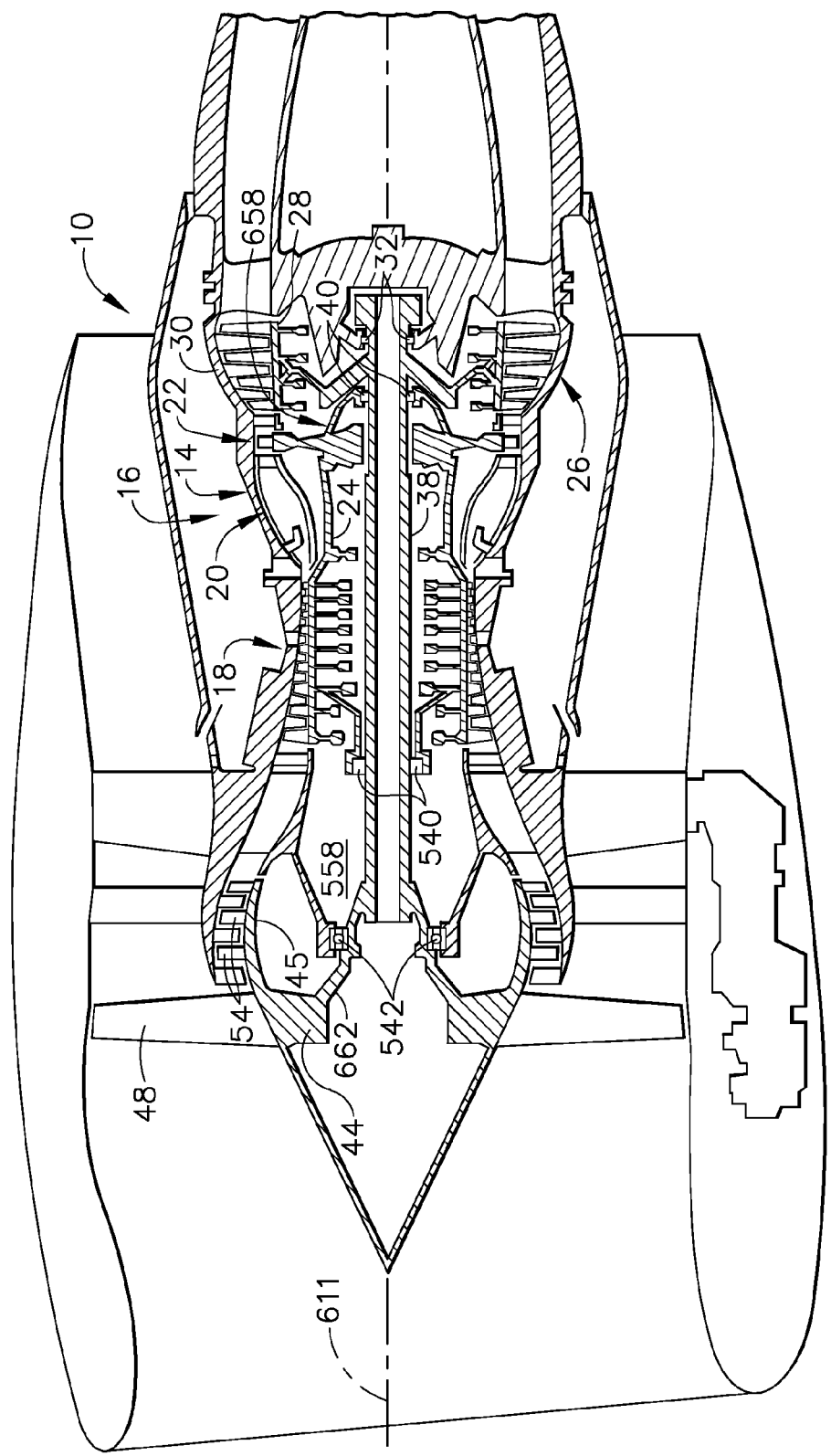
FIG. 1 is a longitudinal axial sectional view of a gas turbine engine.

Referring to the drawings wherein identical reference numerals denote the same elements throughout the various views, FIG. 1 illustrates a gas turbine engine, generally designated 10, incorporating an exemplary embodiment of a free vortex air-oil separator of the present invention. The engine 10 has a longitudinal centerline or axis 611 and an outer stationary annular casing 14 disposed concentrically about and coaxially along the axis 611. The engine 10 includes a gas generator core 16 which is composed of a multi-stage compressor 18, a combustor 20, and a high pressure turbine 22, either single or multiple stage, all arranged coaxially about the longitudinal axis or center line 611 of the engine 10 in a serial, axial flow relationship. An annular outer drive shaft 24 fixedly interconnects the compressor 18 and high pressure turbine 22.

The core 16 is effective for generating combustion gases. Pressurized air from the compressor 18 is mixed with fuel in the combustor 20 and ignited, thereby generating combustion gases. Some work is extracted from these gases by the high pressure turbine 22 which drives the compressor 18. The remainder of the combustion gases are discharged from the core 16 into a low pressure turbine 26.

An inner drive shaft 38 is mounted for rotation relative to the outer drive shaft 24 via rear bearings 32, bearings 40, and via suitable forward bearings 542 interconnected to the outer stationary casing 14. The inner drive shaft 38, in turn, drives a forward fan shaft 662, which in turn drives a forward fan rotor 44 and, in some cases, a booster rotor 45. Fan blades 48 and booster blades 54 are mounted to the fan rotor 44 and booster rotor 45 for rotation therewith.

Figure 2:
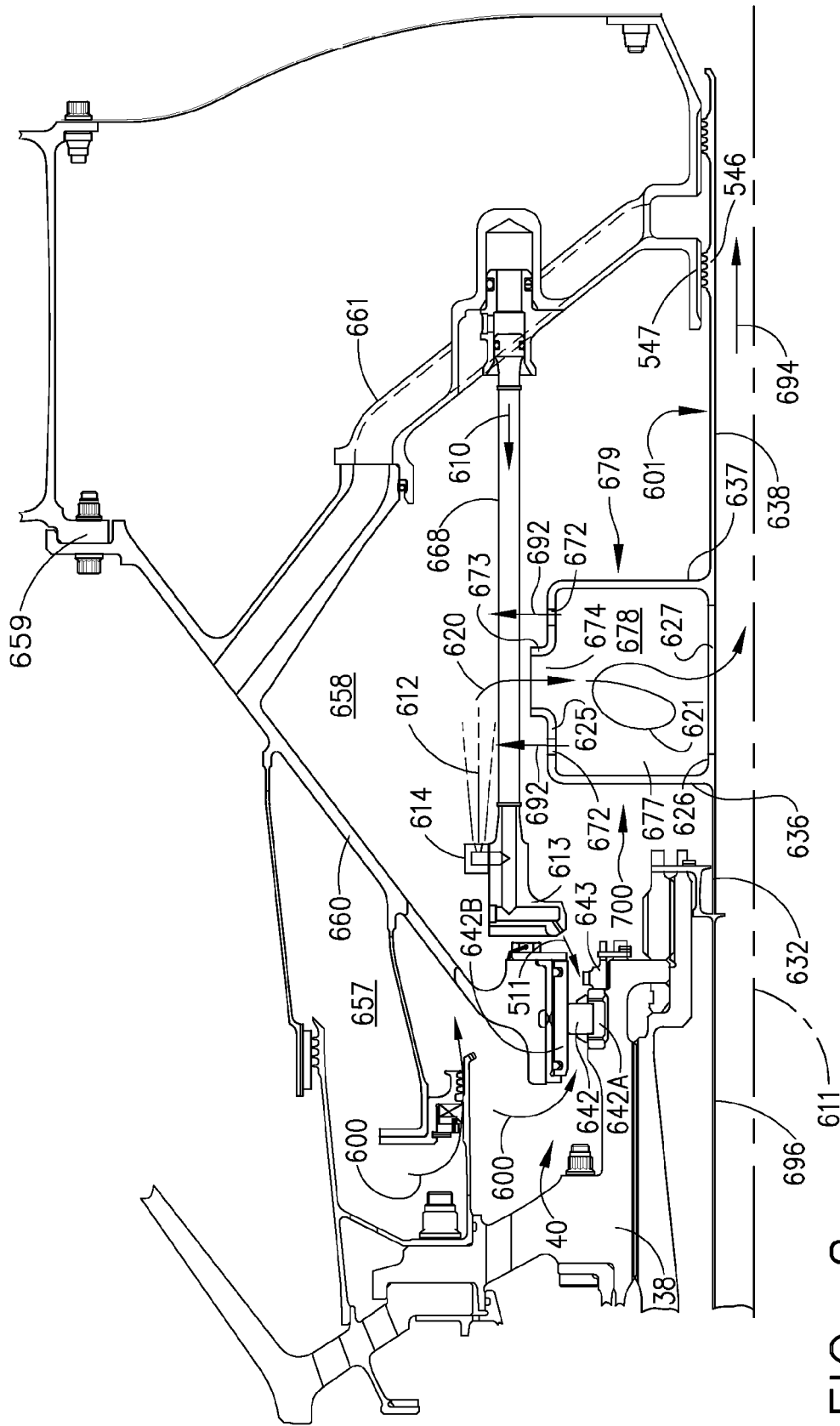
FIG. 2 is an enlarged axial sectional view of a bearing-sump region of a gas turbine engine of FIG. 1, incorporating an exemplary embodiment of a free vortex air-oil separator of the present invention.

Referring to FIG. 2, there is illustrated the region of the gas turbine engine 10 where a bearing sump 658 is defined about the aft bearings 40. The aft bearing is shown as a roller type bearing, for illustrative purposes. Other types of bearings, such as for example, ball bearings, may also be used. The bearing sump 658 is generally defined by an outer annular structure 660, such as a bearing housing, which is interconnected to a static frame 659, a sump cover 661, an inner drive shaft 38, a free vortex chamber 678 and a vent system 601. The inner drive shaft 38, being connected with an annular inner race 642A of the aft bearings 642, rotates with the inner drive shaft 38 relative to the stationary outer annular structure 660 which is connected to an annular outer race 642B of the aft bearings 642. The inner race 642A is attached to the inner drive shaft by a spanner nut 643. Although only one type of bearing is shown in FIG. 2 (see item 642), it is possible to have additional bearings (not shown) mounted on an LP shaft, the forward fan shaft 662 or the inner drive shaft 38 to support the fan and booster rotors, the compressor rotor or the turbine rotors in the engine. Additional oil supply conduits (not shown), similar to 668 shown in FIG. 2, can provide the oil supply to these additional bearings.

Bearing lubrication oil 610 is pumped into the sump 658 through an oil supply conduit 668. A bearing lubrication oil stream 511 is directed to the aft bearings 642 by a nozzle 613. Additional oil streams may be directed at other locations in the sump. Conventional circumferential labyrinth or carbon air and oil seals, such as shown as item 546 in FIG. 2, are provided adjacent to the rotating and static parts to seal the bearing sump 658 to maintain appropriate pressure inside the bearing sump and to prevent the air-oil mixture from escaping from the sump. Pressurized air 600 is injected from a pressurized air cavity 657 which receives air from an air supply system (not shown) in order to prevent oil from leaking through the oil seals. Labyrinth seals, such as shown as item 546 in FIG. 2, between the drive shaft 638 and the static structure 547 prevent leakage of oil from the aft end of the bearing sump 658.

A portion of the injected pressurized air 600 which enters the bearing sump 658 must be vented from the sump 658 in a controlled manner in order to maintain sump pressure at a proper balance. However, the pressurized air becomes mixed with particles of the oil in the sump 658. The air-oil mixture in the bearing sump 658 is shown as item 620 in FIG. 2. A significant loss of oil will occur if the air-oil mixture 620 is vented out without separating and removing the oil particles.

An exemplary embodiment of a system for reducing oil consumption in aircraft engines by using a free vortex air-oil separator 700 for separating oil from an air-oil mixture is shown in FIG. 2. The proposed air/oil separator 700, which can be integrated with a gearbox drive shaft, a low pressure turbine shaft or other suitable rotating components, uses a free vortex to separate the oil particles from the air-oil mixture. The system comprises an oil supply conduit 668 through which an oil supply 610 flows into the sump 658. In order to prevent the leakage of oil from the system, pressurized air 600 is passed from the pressurized air cavity 657 through suitable conventional seals (not shown) into the sump 658. In the exemplary embodiment shown, a free vortex air-oil separator 700 is rigidly connected to a drive shaft 638 which is suitably connected to the inner drive shaft 38. These connections are shown in FIG. 2 are exemplary and any other suitable conventional means of attachment can also be used.

The exemplary embodiment of a free vortex air-oil separator system shown in FIG. 2 further comprises a free vortex chamber 678 wherein the separation of the oil particles from the air-oil mixture takes place, as explained further below. The free vortex air-oil separator 700 comprises a free vortex chamber 678 which is defined by a first chamber wall 636, a second chamber wall 637 located axially aft from the first chamber wall 636, a chamber rim 625 and a chamber base 626. The chamber walls 637 may be integrally formed with the drive shaft 638 as shown in FIG. 2. Alternately, the chamber walls 637 can be made separately and then attached to the drive shaft 638 using conventional attachment means. The oil particles 692 that are separated move radially out along the inner side of the chamber walls 637 and flow out of the free vortex chamber 678 through orifices 672 formed in the chamber rim 625 of the free-vortex chamber 678. The air is vented through interior of the drive shaft 638. Conventional vent tubes may also be used for this purpose.

Figure 3:
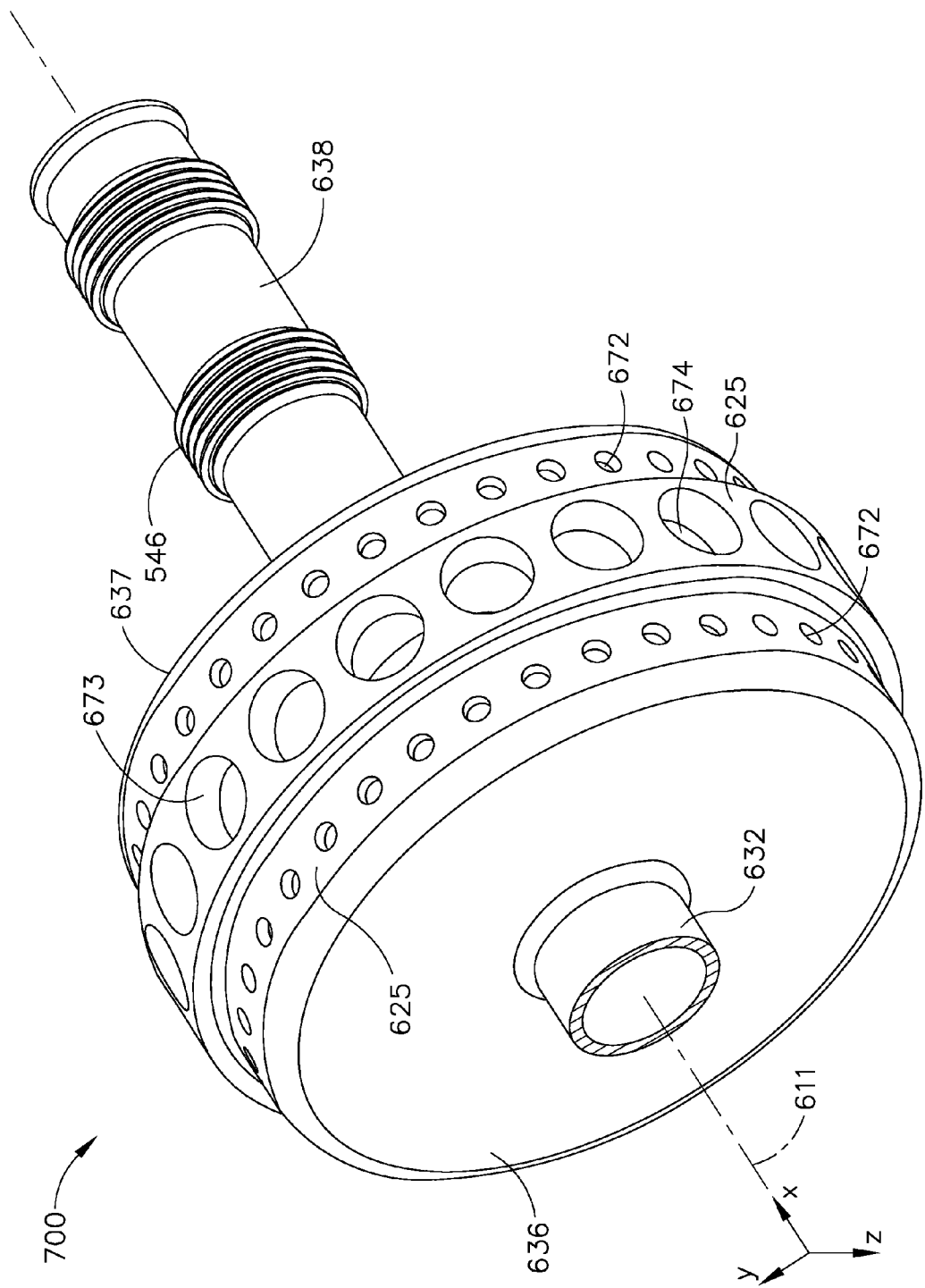
FIG. 3 is a perspective view showing an exemplary embodiment of a free vortex chamber of the present invention.

The rotating free vortex air-oil separator 700 receives the air-oil mixture 620 from the sump 658 and flows it through vent holes 674 into a free vortex chamber 678, creating a vortex 621 in it. An exemplary embodiment of a free vortex air-oil separator 700 is shown in FIG. 3. The free vortex air-oil separator 700 has a free vortex chamber 678 that rotates about the centerline 611. It has a rim 625 located in a radially outer region from the centre line 611. The free vortex air-oil separator rim 625 has a row of vent holes 674 arranged around its circumference. In the exemplary embodiment shown in FIG. 2, the vent holes 674 are located on passages 673 that extend radially outward from the chamber rim 625. In the exemplary embodiment shown in FIG. 2, the orientation of these passages is such that the air-oil mixture 620 enters the vent holes 674 from the sump 658 in a generally radial direction and enters the free vortex chamber 678 in a generally radial direction. Alternatively, in other exemplary embodiments of the invention (not shown), the orientation of the passages 673 may be such that the air-oil mixture 620, is redirected in axial, tangential or radial directions, or in any combinations thereof, with respect to the centerline 611, as it enters the free vortex chamber. In the exemplary embodiment shown in FIG. 2, there is one row of vent holes 674 arranged circumferentially around the rim 625. Alternatively, in other exemplary embodiments of the invention (not shown), there may be multiple rows of vent holes 674 suitably arranged around the rim 625. In the exemplary embodiment shown in FIGS. 2 and 3, the free vortex chamber walls 637 are integrally formed with the drive shaft 638. The free vortex air-oil separator 700 and the drive shaft 638 are connected rotably with inner drive shaft 38 using conventional methods, such as for example, using turbine shaft adapters 632 and/or flanges.

In the free vortex chamber 678, the rotating air-oil mixture vortex 621 swirls down to lower radii towards the free vortex chamber base 626. As the air-oil mixture 620 passes radially inwards through the vent holes 674 and passages 673, it is imparted with some angular momentum from the rotation of the free vortex air-oil separator 700. As the air-oil mixture 620 spins in a free vortex 621 from the chamber rim 625 towards the chamber base 626 having a lower radius and closer to centerline 611 of the drive shaft 638, it spins faster picking up rotational speed in order to conserve its angular momentum. This free vortex 621 results in stronger centrifugal forces on the oil particles than similar forces attained in conventional forced vortex mechanical separators limited to their fixed rotational shaft speed. Additionally, since the air-oil mixture 620 enters the free vortex chamber at a larger radius at the rim 625, the free vortex 621 has a larger dwell time at larger radii within the free vortex chamber 678. As a result of the significant centrifugal forces and dwell time that exist in the free vortex 621 within the free vortex chamber 678, oil particles are centrifuged out. The separated oil particles form an oil film on the walls 637 and rim 625 of the chamber and the inner wall of the shaft 638. The separated air continues to exit to the vent passage through the inner passage 627 at the base 626 of the free vortex chamber 678. The oil film is further centrifuged back (shown as item 692 in FIG. 2) to the sump 658 through orifices 672 located on the rim 625 of the free vortex chamber 678. Alternatively, the separated oil particles may be directed into a separate cavity (not shown) and pumped back to an oil reservoir for further processing and recirculation.

In one aspect of the invention, the oil particle separation is further improved by optionally cooling the air-oil mixture 620 prior to flowing it into the free vortex chamber 678. By cooling the air-oil mixture the density of the oil particles is increased. The oil particles also coalesce into larger droplets at lower temperatures. As a result, the more massive oil particles are more easily removed by the centrifugal forces acting on them in the free vortex swirl 621 in the free vortex chamber 678. One method of cooling the hot air-oil mixture in the sump 658 is by mixing with relatively cooler oil supplied to the sump. This is shown in the exemplary embodiment of the free vortex air-oil separator system shown in FIG. 2. In the exemplary embodiment shown therein, relatively cooler oil 612 is supplied through a nozzle 614 that sprays the cooler oil stream 612 within the sump 658. The cooler oil stream 612 droplets are mixed with the relatively hotter air-oil mixture in the sump 658. This results in a relatively cooler air-oil mixture 620, which is drawn into the free vortex chamber vent holes 674.

The oil particles separated from the air-oil mixture are removed from the free vortex chamber 678 by means of orifices or holes, such as shown as item 672 in FIG. 2, on the rotating free vortex air-oil separator rim 625. The removed oil, shown as item 692 in FIG. 2, flows into the sump 658. The air particles are removed from the free vortex chamber 678 (shown as item 694 in FIG. 2) through a vent exit, such as for example through a conventional center vent tube 696. A conventional scavenge system, (not shown) removes the oil from the sump cavity 658 for further processing before being pumped back into the bearing lubrication system.

As discussed before, dwell time at larger radii, rotational speed (and hence the tangential velocity) and temperature of the free vortex swirl 621 in the free vortex chamber 678 are three important factors which determine the effectiveness of free vortex separation of the oil particles from the air-oil mixture 620. The rotating free vortex air-oil separator 700 increases the rotational speed and hence the tangential velocity of the air-oil mixture 620 as it passes through the vent holes 674 and vent passage 673. The air-oil mixture 620 entering the free vortex chamber 678 has predominantly radial momentum. The air-oil mixture 620 enters the separator cavity at the rim 625 located at a radially outer location from the axis of rotation 611. This feature enables a free vortex flow 621 that has a larger dwell time for rotational, and hence tangential, flow at larger radii as compared to conventional designs using vent holes and radial plugs. In alternative embodiments, this feature may be further enhanced by suitably turning the flow within the vent holes 674 and/or within the vent passage 673 to impart a larger tangential component of velocity in the direction of rotation of the drive shaft 638. In these alternative embodiments, as the air-oil mixture 620 flows within the vent holes 674 and passage 673, it acquires additional tangential velocity, in addition to that imparted to it by the rotation of the air-oil separator 700.

The increase in tangential velocity of the air-oil mixture flow results in a stronger free vortex and higher centrifugal acceleration to separate the oil particles from the air-oil mixture in the free vortex chamber 678. Because the air-oil mixture is drawn tangentially at larger radii outer region location, the air-oil mixture free vortex 621 follows a much longer path before reaching the separator exit 627 and, therefore, the dwell time for the air-oil mixture free vortex is greater than that for conventional configurations.

An exemplary embodiment of the free vortex air-oil separator system using a free vortex air-oil separator 700 is shown in FIG. 2. An exemplary embodiment of a free vortex air-oil separator 700 is shown in FIG. 3. In FIG. 3, the X-axis shown represents the axial direction, Y-axis represents the radial direction and the Z-axis represents the tangential direction, positive in the rotational direction of the drive shaft 638. In the exemplary embodiment of the free vortex air-oil separator 700 shown in FIG. 3, there is one row of vent holes 674 located around the circumference on the rim 625, with the row having about 60 vent holes. The vent holes 674 have a diameter of about 0.250 inch and are equally spaced around the circumference at a radius of 10.00 inches. The vent holes 674 receive the air-oil mixture flow 620 in a generally radial direction and the flow exits into the free vortex chamber in a generally radial direction. In one aspect of the present invention, the free vortex air-oil separator 700 may have passages 673 extending from the rim 625. Air-oil mixture from the sump can enter and pass through these passages prior to entering the free vortex chamber 678. It is possible to have a plurality of these passages 673 arranged circumferentially around the rim 625. In another aspect of the present invention, the passages may have an orientation with respect to the rotational axis 611 so that the air-oil mixture enters the free vortex chamber 678 at an orientation that is not purely radial.

The free vortex air-oil separator 700 is manufactured from a material which is capable of withstanding the temperatures prevailing in the sump 658, which is approximately 149 Deg. C. (300 Deg. F.), and resisting attack from the engine lubricating oil. Conventional turbine rotor materials, such as Inconel 718, may be used for making the free vortex air-oil separator 700 and the drive shaft 638. The free vortex air-oil separator 700 may be formed by any known method, for example forging followed by machining, or by machining from a blank of material or by welding different components together.

It has been found that in general that oil separation efficiency for free vortex separators tends to increase with oil particle size, and may approach 100% for large oil particles of 15 microns or higher. Engine concept testing done on a gas turbine engine test has confirmed that free-vortex air-oil separation described and disclosed herein is more effective than other methods using conventional forced vortex. Gas turbine engine oil consumption was reduced by approximately 50% an engine test using the free-vortex air-oil separation. In addition, it was found that the free vortex air-oil separator with or without an oil spray cooler/coalescer device could potentially reduce overall weight of separation device by reducing or eliminating the need for additional honeycomb passages and/or porous matrix in conventional shaft holes to act as a coalescers in conventional systems, and by possibly eliminating the need for carbon seals in high vent flow systems. In addition, the free vortex air-oil separator described and disclosed herein has further advantages over conventional system, such as for example, the ability to be mounted on a low pressure turbine shaft and the ability to be mounted internally or externally on a gear box shaft.

While the invention has been described in terms of various specific embodiments, those skilled in the art will recognize that the invention can be practiced with modification within the spirit and scope of the claims.

What is claimed is:

1. A free vortex air-oil separator comprising:
   a free vortex chamber comprising a first chamber wall, a second chamber wall located axially aft from the first chamber wall and a rim located in a radially outer region from an axis of rotation;
   a plurality of vent holes in the rim for flowing an air-oil mixture therethrough;
   a cavity formed by the first chamber wall, the second chamber wall and the rim, wherein a free vortex is created when there is a flow into the cavity through the plurality of vent holes; and
   at least one passage on the rim for flowing an air-oil mixture therethrough.

2. A free vortex air-oil separator according to claim 1 wherein:
   the plurality of vent holes are arranged in a circumferential direction.

3. A free vortex air-oil separator according to claim 1 further comprising:
   an inner passage located at a radially inner region from the vent holes for removing air from the free vortex chamber.

4. A free vortex air-oil separator according to claim 1 wherein the air-oil mixture is cooled prior to its entry into the free vortex air-oil separator.

5. A free vortex air-oil separator according to claim 1 further comprising:
   a plurality of inner passages located at a radially inner region from the vent holes for removing air from the free vortex chamber.

6. A free vortex air-oil separator according to claim 5 further comprising:
   the plurality of inner passages are arranged in a circumferential direction.

7. A free vortex air-oil separator according to claim 1 wherein:
   the rim has a plurality of orifices extending through the rim for removing oil from the free vortex chamber.

8. A free vortex air-oil separator according to claim 7 wherein:
   the plurality of orifices are arranged in a circumferential direction.

9. A free vortex air-oil separator according to claim 7 wherein:
   the plurality of orifices are arranged in a plurality of circumferential rows, each circumferential row being located at a different axial location.

10. A free vortex air-oil separator comprising:
    a free vortex chamber comprising a first chamber wall, a second chamber wall located axially aft from the first chamber wall and a rim located in a radially outer region from an axis of rotation;
    a plurality of vent holes in the rim for flowing an air-oil mixture therethrough;
    a cavity formed by the first chamber wall, the second chamber wall and the rim, wherein a free vortex is created when there is a flow into the cavity through the plurality of vent holes; and
    a plurality of passages on the rim for flowing an air-oil mixture therethrough.

11. A free vortex air-oil separator according to claim 10 wherein:
    at least one passage is oriented at an angle to the axis of rotation.

12. A free vortex air-oil separator according to claim 10 wherein:
    the plurality of passages are arranged in a circumferential direction.

13. A bearing lubrication system comprising:
    a bearing;
    an oil supply conduit that supplies lubricating oil to the bearing;
    a sump cavity having a mixture of air and oil;
    a pressurized air cavity located outside the sump cavity;
    a free vortex air-oil separator located inside the sump cavity wherein the free vortex air-oil separator comprises a rotating annular structure comprising a first chamber wall, a second chamber wall located axially aft from the first chamber wall, a rim located in a radially outer region from an axis of rotation, and a plurality of vent holes in flow communication with the sump cavity wherein a free vortex is created when there is a flow into the free vortex air-oil separator through the plurality of vent holes; and
    a plurality of passages on the rim for flowing an air-oil mixture therethrough.

14. A bearing lubrication system according to claim 13 wherein:
    the rim has a plurality of orifices extending through the rim for removing oil from the free vortex chamber.

15. A bearing lubrication system according to claim 13 wherein:
    at least one of the plurality of passages is oriented at an angle to the axis of rotation.

16. A bearing lubrication system according to claim 13 wherein the air-oil mixture is cooled prior to its entry into the free vortex air-oil separator.

17. A bearing lubrication system according to claim 13 further comprising:

a nozzle for directing a spray of cooling oil into the sump.

18. A bearing lubrication system according to claim 13 further comprising:

a plurality of inner passages located at a radially inner region from the vent holes for removing air from the free vortex air-oil separator.

* * * * *